(12) United States Patent
Bunker et al.

(10) Patent No.: US 10,450,874 B2
(45) Date of Patent: Oct. 22, 2019

(54) AIRFOIL FOR A GAS TURBINE ENGINE

(71) Applicant: General Electric Company, Schenectady, NY (US)

(72) Inventors: Ronald Scott Bunker, West Chester, OH (US); Robert David Briggs, West Chester, OH (US); Jason Randolph Allen, Loveland, OH (US); Kevin Robert Feldmann, Mason, OH (US)

(73) Assignee: General Electric Company, Schenectady, NY (US)

( * ) Notice: Subject to any disclaimer, the term of this patent is extended or adjusted under 35 U.S.C. 154(b) by 826 days.

(21) Appl. No.: 15/043,513

(22) Filed: Feb. 13, 2016

(65) Prior Publication Data
US 2017/0234140 A1   Aug. 17, 2017

(51) Int. Cl.
*F01D 5/18* (2006.01)
*F01D 9/04* (2006.01)
*F01D 25/12* (2006.01)

(52) U.S. Cl.
CPC ............. *F01D 5/187* (2013.01); *F01D 5/188* (2013.01); *F01D 9/041* (2013.01); *F01D 25/12* (2013.01); *F05D 2220/32* (2013.01); *F05D 2240/12* (2013.01); *F05D 2240/30* (2013.01); *F05D 2250/185* (2013.01); *F05D 2260/2212* (2013.01); *F05D 2260/607* (2013.01); *Y02T 50/676* (2013.01)

(58) Field of Classification Search
CPC ... F01D 5/187; F01D 5/188; F05D 2260/2212
See application file for complete search history.

(56) References Cited

U.S. PATENT DOCUMENTS

| 5,052,889 | A | | 10/1991 | Abdel-Messeh |
| 5,462,405 | A | * | 10/1995 | Hoff ........................ F01D 5/187 |
| | | | | 415/115 |
| 5,624,231 | A | | 4/1997 | Ohtomo et al. |
| 6,224,336 | B1 | | 5/2001 | Kercher |
| 7,137,784 | B2 | * | 11/2006 | Hall ......................... F01D 5/187 |
| | | | | 416/97 R |

(Continued)

FOREIGN PATENT DOCUMENTS

| EP | 0 661 414 A1 | 7/1995 |
| EP | 1 882 817 A2 | 1/2008 |

(Continued)

OTHER PUBLICATIONS

Extended European Search Report and Opinion issued in connection with corresponding EP Application No. 17155629.3 dated Aug. 7, 2017.

(Continued)

*Primary Examiner* — Kevin F Murphy
(74) *Attorney, Agent, or Firm* — McGarry Bair PC

(57) ABSTRACT

A method and apparatus for an airfoil in a gas turbine engine can include an outer surface bounding an interior. At least one flow channel can be defined among one or more full-length and partial-length ribs to further define a cooling circuit within the airfoil. The cooling circuit can have at least one tip turn at the partial-length rib, having at least on fastback turbulator disposed at least partially within the tip turn.

20 Claims, 6 Drawing Sheets

(56) References Cited

U.S. PATENT DOCUMENTS

| | | | |
|---|---|---|---|
| 7,168,921 B2* | 1/2007 | Honkomp | F01D 5/18 |
| | | | 416/241 B |
| 7,695,243 B2* | 4/2010 | Lee | F01D 5/188 |
| | | | 415/115 |
| 7,837,440 B2 | 11/2010 | Bunker et al. | |
| 8,408,872 B2 | 4/2013 | Briggs et al. | |
| 8,985,940 B2* | 3/2015 | Zhang | F01D 5/081 |
| | | | 415/115 |
| 2004/0076519 A1* | 4/2004 | Halfmann | B22C 9/04 |
| | | | 416/97 R |
| 2005/0069414 A1 | 3/2005 | Liang | |
| 2006/0008350 A1 | 1/2006 | Chlus et al. | |
| 2010/0126960 A1 | 5/2010 | Cunha | |
| 2013/0343872 A1 | 12/2013 | Tibbott et al. | |
| 2014/0140860 A1 | 5/2014 | Tibbott et al. | |
| 2014/0212297 A1 | 7/2014 | Goeller et al. | |
| 2014/0219813 A1 | 8/2014 | Perez et al. | |
| 2015/0322798 A1 | 11/2015 | Bauer et al. | |

FOREIGN PATENT DOCUMENTS

| | | |
|---|---|---|
| EP | 2 564 029 A1 | 3/2013 |
| EP | 2 949 865 A1 | 12/2015 |
| GB | 2473949 A | 3/2011 |
| WO | 2015/184294 A1 | 12/2015 |

OTHER PUBLICATIONS

Office Action issued in connection with corresponding CA Application No. 2956912 dated Apr. 20, 2018.

* cited by examiner

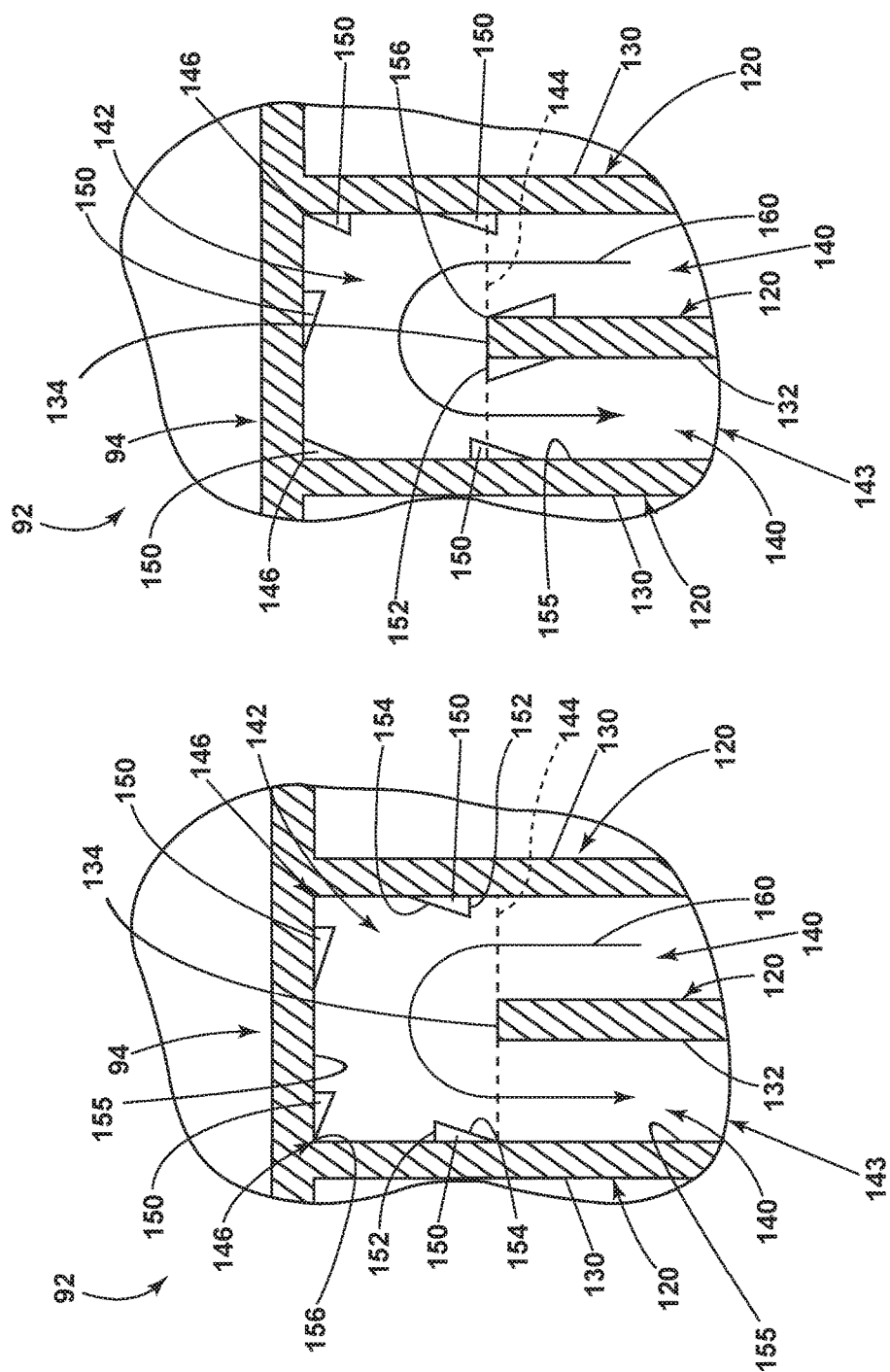

AIRFOIL FOR A GAS TURBINE ENGINE

BACKGROUND OF THE INVENTION

Turbine engines, and particularly gas or combustion turbine engines, are rotary engines that extract energy from a flow of combusted gases passing through the engine onto a multitude of rotating turbine blades.

Gas turbine engines for aircraft are designed to operate at high temperatures to maximize engine efficiency, so cooling of certain engine components, such as the high pressure turbine and the low pressure turbine, can be beneficial. Typically, cooling is accomplished by ducting cooler air from the high and/or low pressure compressors to the engine components that require cooling. Temperatures in the high pressure turbine are around 1000° C. to 2000° C. and the cooling air from the compressor is around 500° C. to 700° C. While the compressor air is a high temperature, it is cooler relative to the turbine air, and can be used to cool the turbine.

Contemporary turbine blades generally include one or more interior cooling circuits for routing the cooling air through the blade to cool different portions of the blade, and can include dedicated cooling circuits for cooling different portions of the blade. The cooling circuits can include one or more airflow element to enhance the cooling, however, such elements can lead to excessive collection of dust or particular matter reducing service life or requiring additional maintenance.

BRIEF DESCRIPTION OF THE INVENTION

In one aspect, embodiments of the invention relate to an airfoil for a gas turbine engine including an outer surface bounding an interior and defining a pressure sidewall and a suction sidewall extending axially between a leading edge and a trailing edge to define a chord-wise direction and extending radially between a root and a tip to define a span-wise direction. The airfoil further includes a cooling circuit located within the interior and having at least one chord-wise spaced full-length rib and partial-length rib to define a flow channel therebetween, with the full length rib extending span-wise from the root to the tip and in contact with the tip, and the partial-length rib extending span-wise and terminating prior to the tip to define a tip turn for the flow channel. At least one fastback turbulator is disposed at least partially within the tip turn.

In another aspect, embodiments of the invention relate to a method of minimizing dust collection in a gas turbine engine having an airfoil with a flow channel extending span-wise from a tip to a root and having a tip turn. The method includes flowing a cooling fluid over at least one fastback turbulator disposed at least partially within the tip turn.

In yet another aspect, embodiments of the invention relate to an airfoil for a gas turbine engine including an outer surface bounding an interior and extending radially between a root and a tip to define a span-wise direction having a tip turn in the interior adjacent the tip with at least one fastback turbulator disposed at least partially within the tip turn.

BRIEF DESCRIPTION OF THE DRAWINGS

In the drawings:

FIG. 4 is a cross-section view of the airfoil of FIG. 2 illustrating a tip turn having fastback turbulators disposed within the tip turn.

FIG. 5 is a cross-sectional view of the airfoil of FIG. 2 having the fastback turbulators disposed at least partially within the tip turn.

DESCRIPTION OF EMBODIMENTS OF THE INVENTION

Figure 1:
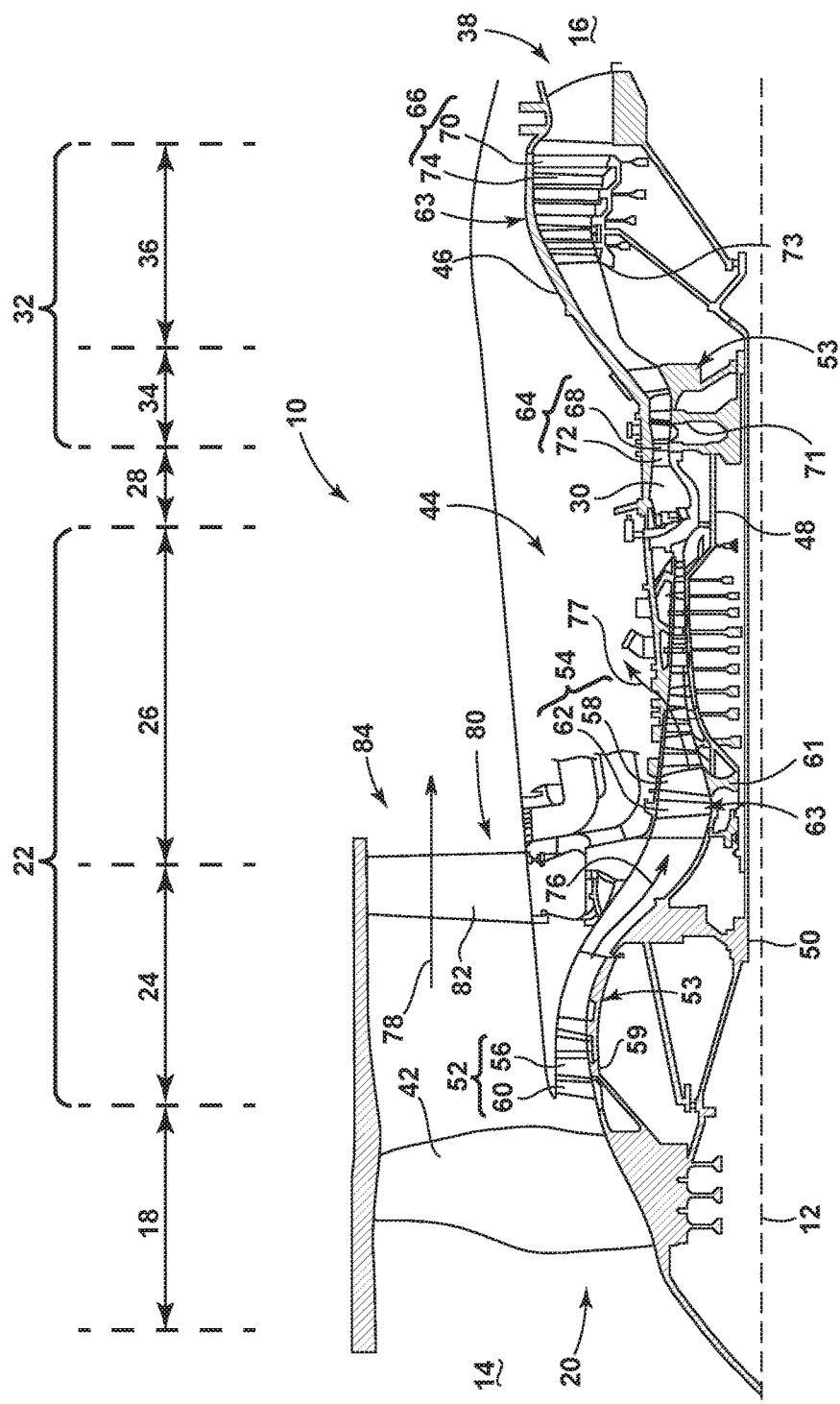
FIG. 1 is a schematic cross-sectional diagram of a gas turbine engine for an aircraft.

The described embodiments of the present invention are directed to an airfoil for a gas turbine engine having at least one fastback turbulator disposed at least partially within an internal tip turn. For purposes of illustration, the present invention will be described with respect to the turbine for an aircraft gas turbine engine. It will be understood, however, that the invention is not so limited and may have general applicability within an engine, including compressors, as well as in non-aircraft applications, such as other mobile applications and non-mobile industrial, commercial, and residential applications.

As used herein, the term "forward" or "upstream" refers to moving in a direction toward the engine inlet, or a component being relatively closer to the engine inlet as compared to another component. The term "aft" or "downstream" used in conjunction with "forward" or "upstream" refers to a direction toward the rear or outlet of the engine relative to the engine centerline.

Additionally, as used herein, the terms "radial" or "radially" refer to a dimension extending between a center longitudinal axis of the engine and an outer engine circumference.

All directional references (e.g., radial, axial, proximal, distal, upper, lower, upward, downward, left, right, lateral, front, back, top, bottom, above, below, vertical, horizontal, clockwise, counterclockwise, upstream, downstream, aft, etc.) are only used for identification purposes to aid the reader's understanding of the present invention, and do not create limitations, particularly as to the position, orientation, or use of the invention. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

FIG. 1 is a schematic cross-sectional diagram of a gas turbine engine 10 for an aircraft. The engine 10 has a generally longitudinally extending axis or centerline 12 extending forward 14 to aft 16. The engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a plurality of fan blades 42 disposed radially about the centerline 12. The HP compressor 26, the combustor 30, and the HP turbine 34 form a core 44 of the engine 10, which generates combustion gases. The core 44 is surrounded by core casing 46, which can be coupled with the fan casing 40.

A HP shaft or spool 48 disposed coaxially about the centerline 12 of the engine 10 drivingly connects the HP turbine 34 to the HP compressor 26. A LP shaft or spool 50, which is disposed coaxially about the centerline 12 of the engine 10 within the larger diameter annular HP spool 48, drivingly connects the LP turbine 36 to the LP compressor 24 and fan 20.

The LP compressor 24 and the HP compressor 26 respectively include a plurality of compressor stages 52, 54, in which a set of compressor blades 56, 58 rotate relative to a corresponding set of static compressor vanes 60, 62 (also called a nozzle) to compress or pressurize the stream of fluid passing through the stage. In a single compressor stage 52, 54, multiple compressor blades 56, 58 can be provided in a ring and can extend radially outwardly relative to the centerline 12, from a blade platform to a blade tip, while the corresponding static compressor vanes 60, 62 are positioned upstream of and adjacent to the rotating blades 56, 58. It is noted that the number of blades, vanes, and compressor stages shown in FIG. 1 were selected for illustrative purposes only, and that other numbers are possible.

The blades 56, 58 for a stage of the compressor can be mounted to a disk 61, which is mounted to the corresponding one of the HP and LP spools 48, 50, with each stage having its own disk 61. The vanes 60, 62 for a stage of the compressor can be mounted to the core casing 46 in a circumferential arrangement.

The HP turbine 34 and the LP turbine 36 respectively include a plurality of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 can be provided in a ring and can extend radially outwardly relative to the centerline 12, from a blade platform to a blade tip, while the corresponding static turbine vanes 72, 74 are positioned upstream of and adjacent to the rotating blades 68, 70. It is noted that the number of blades, vanes, and turbine stages shown in FIG. 1 were selected for illustrative purposes only, and that other numbers are possible.

The blades 68, 70 for a stage of the turbine can be mounted to a disk 71, which is mounted to the corresponding one of the HP and LP spools 48, 50, with each stage having its own disk 71, 73. The vanes 72, 74 for a stage of the compressor can be mounted to the core casing 46 in a circumferential arrangement.

The portions of the engine 10 mounted to and rotating with either or both of the spools 48, 50 are also referred to individually or collectively as a rotor 53. The stationary portions of the engine 10 including portions mounted to the core casing 46 are also referred to individually or collectively as a stator 63.

In operation, the airflow exiting the fan section 18 is split such that a portion of the airflow is channeled into the LP compressor 24, which then supplies pressurized air 76 to the HP compressor 26, which further pressurizes the air. The pressurized air 76 from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the engine 10 via the exhaust section 38. The driving of the LP turbine 36 drives the LP spool 50 to rotate the fan 20 and the LP compressor 24.

A remaining portion of the airflow 78 bypasses the LP compressor 24 and engine core 44 and exits the engine assembly 10 through a stationary vane row, and more particularly an outlet guide vane assembly 80, comprising a plurality of airfoil guide vanes 82, at the fan exhaust side 84. More specifically, a circumferential row of radially extending airfoil guide vanes 82 are utilized adjacent the fan section 18 to exert some directional control of the airflow 78.

Some of the air supplied by the fan 20 can bypass the engine core 44 and be used for cooling of portions, especially hot portions, of the engine 10, and/or used to cool or power other aspects of the aircraft. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid can be, but is not limited to, fluid discharged from the LP compressor 24 or the HP compressor 26.

Figure 2:
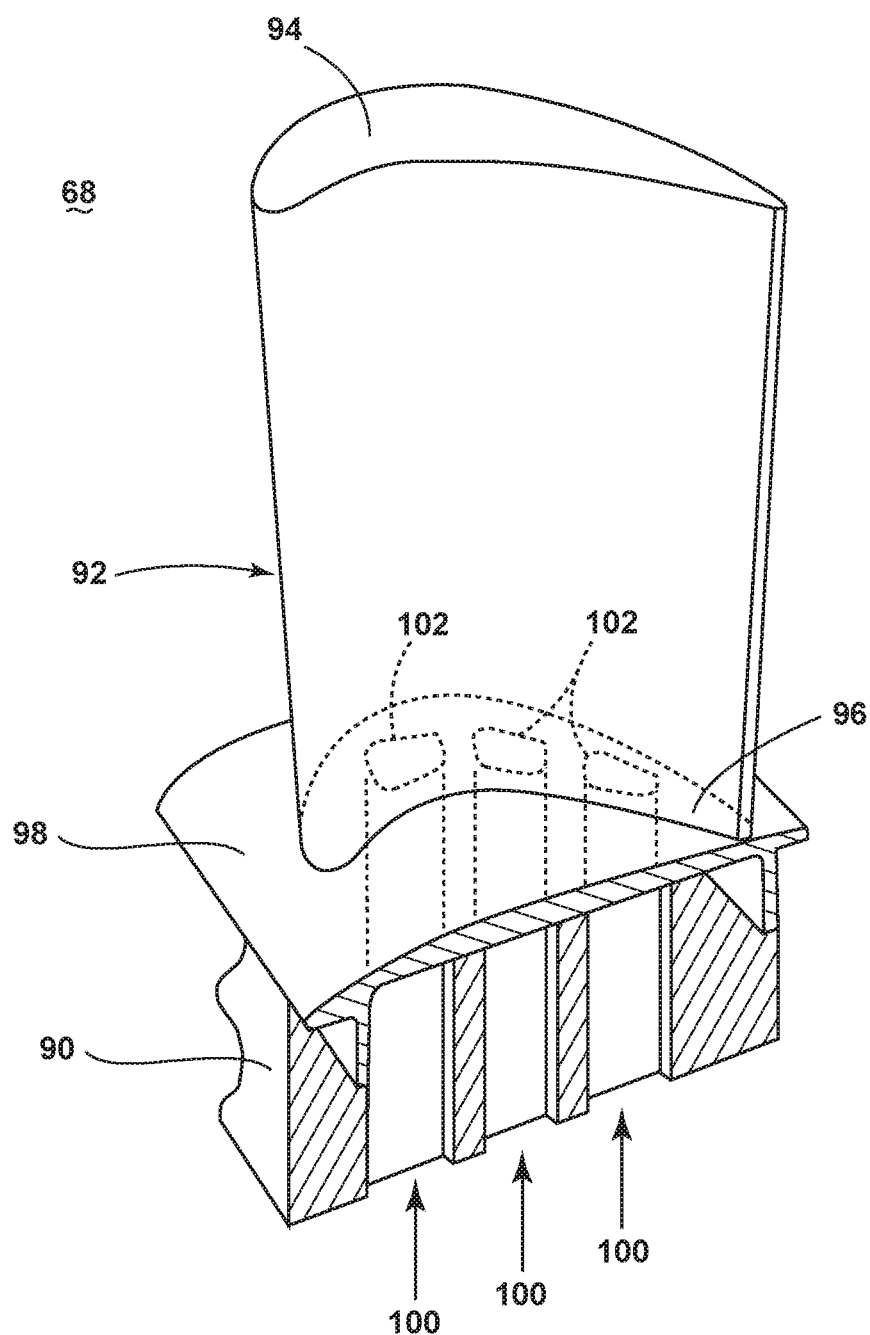
FIG. 2 is an isometric view of an airfoil of the gas turbine engine of FIG. 1.

FIG. 2 is a perspective view of an engine component in the form of one of the turbine blades 68 of the engine 10 from FIG. 1. The turbine blade 68 includes a dovetail 90 and an airfoil 92. The airfoil 92 extends from a tip 94 to a root 96 defining a span-wise direction. The dovetail 90 further includes a platform 98 integral with the airfoil 92 at the root 96, which helps to radially contain the turbine airflow. The dovetail 90 can be configured to mount to a turbine rotor disk 71 on the engine 10. The dovetail 90 comprises at least one inlet passage 100, exemplarily shown as a three inlet passages 100, each extending through the dovetail 90 to provide internal fluid communication with the airfoil 92 at a passage outlet 102. It should be appreciated that the dovetail 90 is shown in cross-section, such that the inlet passages 100 are housed within the body of the dovetail 90.

Figure 3:
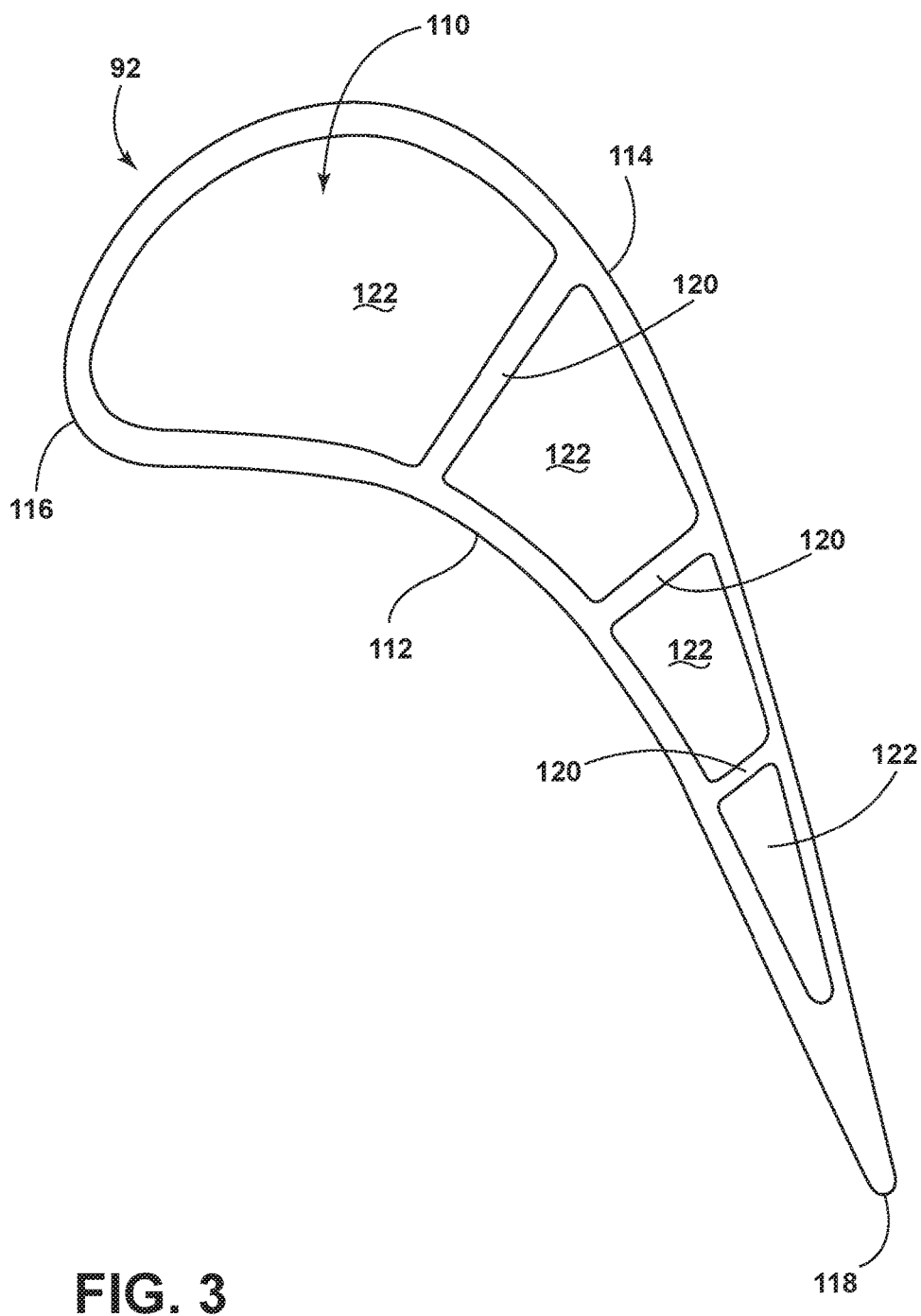
FIG. 3 is a cross-sectional view of the airfoil of FIG. 2 having ribs defining cooling flow channels.

Turning to FIG. 3, the airfoil 92, shown in cross-section, has an interior 110 bounded by an outer wall defined as a concave-shaped pressure sidewall 112 and a convex-shaped suction sidewall 114 which are joined together to define the airfoil shape with a leading edge 116 and a trailing edge 118, defining a chord-wise direction therebetween. The blade 68 rotates in a direction such that the pressure sidewall 112 follows the suction sidewall 114. Thus, as shown in FIG. 3, the airfoil 92 would rotate upward toward the top of the page.

The airfoil 92 further includes a plurality of ribs 120 disposed within the interior 110, which can extend between the pressure and suction sidewalls 112, 114. Alternatively, the ribs 120 can extend partially between the pressure and suction sidewalls 112, 114, or in any other direction or manner within the interior 110. The ribs 120 define a plurality of channels 122 extending in the span-wise direction at least partially between the tip 94 and the root 96.

Referring to FIG. 4, a cross-section view of the airfoil 92 illustrates three ribs 120, with two full-length ribs 130 having one partial-length rib 132 disposed therebetween. The full-length ribs 130 extend fully in the span-wise direction between the root 96 and the tip 94. The partial length rib 132 extends only partially in the span-wise direction, having a terminal end 134 being spaced from the tip 94. It should be appreciated that, alternatively, the full-length ribs 130 do not need to extend fully to the root 96, but can extend from the tip 94 partially in the span-wise direction, terminating prior to the root 96.

A flow channel 140 can be defined between each rib 120, having one flow channel 140 disposed between the partial length rib 132 and each full-length rib 130. The flow channels 140 can be in fluid communication via a tip turn 142 disposed in the space between the partial-length rib 132 and the tip 94. The combined flow channels 140 and tip turn 142 can define a cooling circuit 143 extending through the airfoil 92 in a serpentine manner. It is understood that the ribs 120 can be disposed in a multitude of different orientations, defining multiple cooling circuits within the airfoil 92.

The tip turn 142 can be defined as the span-wise area radially outward of the partial-length rib 132 illustrated as a turn axis 144. The tip turn 142 can further include one or more corners 146 at the junction between the full-length ribs 130 and the tip 94.

One or more fastback turbulators 150 can be disposed within the tip turn 142. The fastback turbulator can be made by additive manufacturing, or any other known manufacturing technique. The fastback turbulator includes a facing wall 152 and an angled wall 154. The facing wall 152 can extend from an interior surface 155 of the full-length rib 130, the partial-length rib 132, an outer wall such as the pressure or suction sidewalls 112, 114, or the tip 94, being disposed orthogonal to the interior surface 155 upon which the fastback turbulator mounts 150. The facing wall 152 faces the bulk flow of cooling fluid flow within the flow channel 140. Alternatively, the facing wall 152 can be angled relative to the interior surface 155, such that it is offset from orthogonal to the interior surface 155. The angled wall 154 extends from the end of the facing wall 152, returning at a terminal end 156 at the interior surface 155 to which the fastback turbulator 150 mounts. In variations of the angled wall 154, it is contemplated that the angled wall 154 can be curved, linear, segmented, regional, or otherwise in non-limiting examples.

It should be appreciated that the tip turn should not be limited to a tip turn defined in a cooling circuit between internal ribs as shown in FIG. 4A, but can be any tip turn within the interior of the airfoil 92. For example, a passage extending span-wise toward the tip, turning 90-degrees, such as with a tip flag, can define the tip turn and can include the fastback turbulators therein. Additional tip turns within the airfoil disposed at the tip can include the fastback turbulators as described herein, such as within a cooling circuit, sub-circuit, cooling mesh, pin bank, or similar in non-limiting examples.

The fastback turbulator 150 can be disposed fully within the tip turn 142. As a cooling fluid flow 160 passes within the cooling circuit 143, it passes over the fastback turbulator 150 to turbulate the cooling fluid flow 160 within the airfoil 92 to provide enhanced cooling. Furthermore, the fastback turbulator 150 can be disposed on the tip 94. The fastback turbulator 150 can be mounted at the tip 94 such that the terminal end 156 or facing wall 152 is disposed in the corner 146.

Additionally, the fastback turbulator 150 can be disposed on the full-length rib 130 having the terminal end 156 or the facing wall 152 disposed in the corner 146, as shown in FIG. 5. The fastback turbulator 150 can be disposed at least partially within the tip turn 142 and can be disposed on the partial-length rib 132. For example, the fastback turbulators 150 can be disposed on the full-length ribs 130 and partially within the tip turn 142, having the turn axis 144 intersecting the fastback turbulator 150. Furthermore, the fastback turbulators 150 can be disposed on the partial-length rib 132, terminating at the turn axis 144 at either the facing wall 152 or the terminal end 156 of the angled wall 154, while still being at least partially within the tip turn 142. It should be further appreciated that the fastback turbulators 150 can be disposed on the pressure or suction sidewalls 112, 114.

Figure 6:
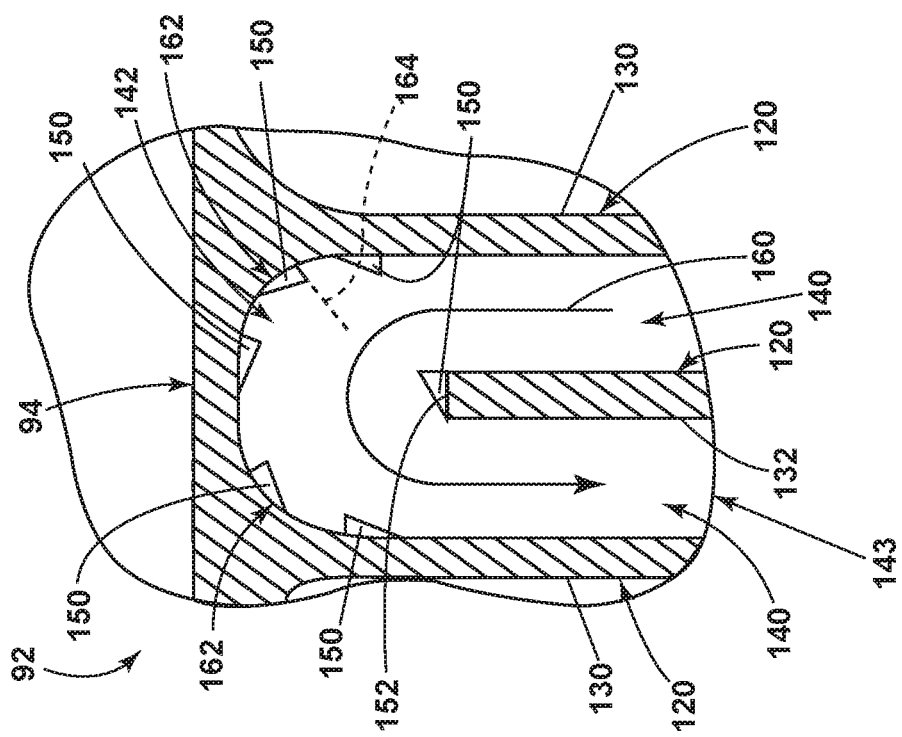
FIG. 6 is a cross-sectional view of the airfoil of FIG. 2 having fastback turbulators disposed on an arcuate surface of the tip turn.

Referring now to FIG. 6, the tip turn 142 can have arcuate corners 162, such as a fillet between the full-length rib 130 and the tip 94 in one example. The fastback turbulators 150 can be disposed on the arcuate corners 162. The facing wall 152 of the fastback turbulators 150 can be disposed orthogonal to the surface to which the fastback turbulator 150 mounts, illustrated along an orthogonal axis 164. Alternatively, the facing wall 152 can be angularly offset from orthogonal axis 164 from the surface at which the fastback turbulator 150 mounts.

Figure 7:
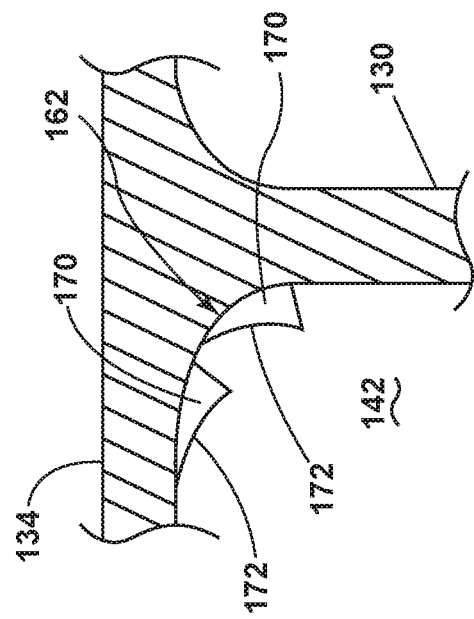
FIG. 7 is a close-up view of the arcuate surface of FIG. 6 having fastback turbulators with an arcuate wall complementary to the arcuate surface.

Referring now to FIG. 7, a fastback turbulator 170 disposed on the arcuate corner 162 can have an arcuate wall 172, as opposed to the linear angled wall 154 of FIGS. 4-6. The arcuate wall 172 can have an arcuate, concave surface being complementary to that of the arcuate corner 162 to which the fastback turbulator 170. For example, if the fastback turbulator 170 is mounted along 30 degrees of a radiused, arcuate corner 162, the arcuate wall 172 can define a similarly radiused surface Alternatively, the arcuate corners 162 can be disposed at the junction between the pressure or suction sidewalls 112, 114 and the tip 94, having the fastback turbulator 170 with an arcuate wall 172 disposed therein.

Figure 8:
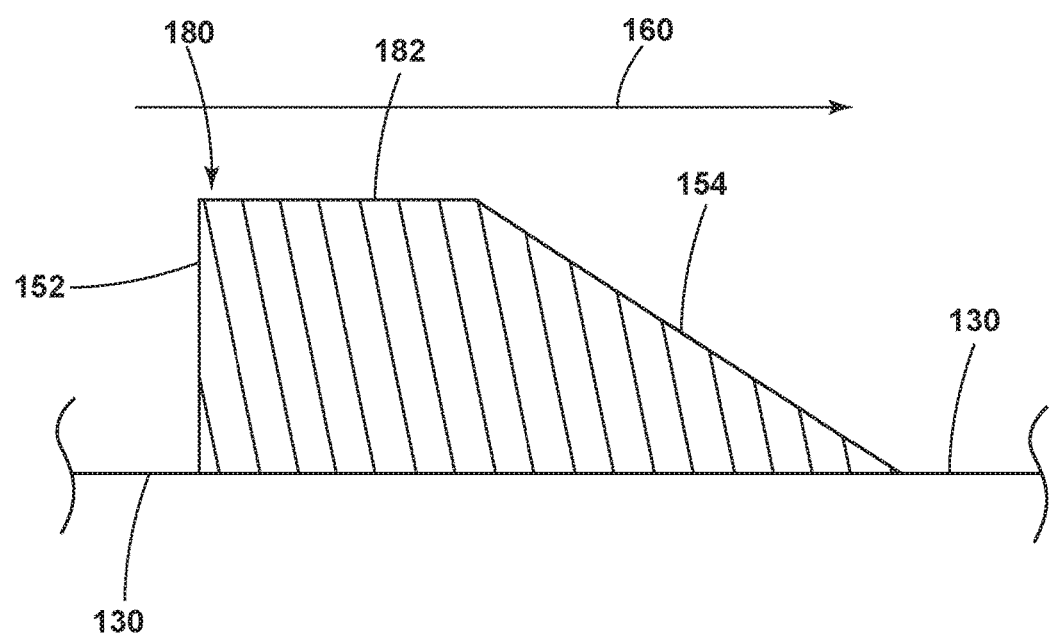
FIG. 8 is a profile view of an additional embodiment of a fastback turbulator having a flat wall.

Referring to FIG. 8, an additional exemplary fastback turbulator 180 is illustrated. The fastback turbulator 180 includes a facing wall 152 confronting the cooling fluid flow 160 and an angled wall 154 and includes a flat wall 182 disposed between the facing wall 152 and the angled wall 154.

It should be understood that the arcuate fastback turbulator 170 as shown in FIG. 7 or the fastback turbulator 180 as shown in FIG. 8 can be implemented in place of any fastback turbulator as described herein. The fastback turbulators 150, 170, 180 can be disposed on either the full-length or partial-length ribs 130, 132, or within the corners 146, arcuate corners 162, or any other surface within any tip turn 142, in non-limiting examples.

A method of minimizing dust collection in the gas turbine engine 10 having the airfoil 92 with the flow channel 140 extending span-wise from the root 96 to the tip 94 and having the tip turn 142 includes flowing a cooling fluid over at least one fastback turbulator 150, 170, 180 disposed at least partially within the tip turn 142. Additionally, the method can include shaping the fastback turbulator 150, 170, 180 to follow the curvature of the tip turn 142. Flowing the cooling fluid can further include flowing the cooling fluid 160 over at least one fastback turbulator on at least one full-length rib 130 or at least on partial-length rib 132, or both. Further, flowing the cooling fluid 160 can include flowing the cooling fluid 160 over at least one fastback turbulator 150, 170, 180 on at least one of the pressure or suction sidewalls 112, 114. The fastback turbulators 150, 170, 180 provide for generating a flow which tends to reduce the incidence of dust collection as well as increase the cooling efficiency within the airfoil.

It should be appreciated that the fastback turbulators 150, 170 provide for turbulation of the cooling fluid flow 160 to provide enhanced cooling within the cooling circuit 143. The use of fastback turbulators 150, 170, 180 within the tip turn 142 provides for decreased accumulation of dust or particulate matter, improving airfoil lifetime and minimizing required airfoil maintenance.

It should be appreciated that application of the disclosed design is not limited to turbine engines with fan and booster sections, but is applicable to turbojets and turbo engines as well.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An airfoil for a turbine engine, the airfoil comprising:
    an outer wall bounding an interior and defining a pressure sidewall and a suction sidewall extending axially between a leading edge and a trailing edge to define a chord-wise direction and extending radially between a root and a tip to define a span-wise direction;
    a cooling circuit located within the interior and having at least one chord-wise spaced full-length rib and partial-length rib to define a flow channel therebetween, with the full-length rib extending span-wise and in contact with the tip, and the partial-length rib extending span-wise and terminating prior to the tip to define a tip turn for the flow channel; and
    a plurality of turbulators each having a flat facing wall extending perpendicular from an interior surface of the tip turn and having an angled wall returning to the interior surface from the flat facing wall, having the plurality of turbulators disposed at least partially within the tip turn.

2. The airfoil of claim 1 wherein the tip turn is defined within the span-wise distance from a radially terminal end of the partial-length rib to the tip.

3. The airfoil of claim 2 wherein at least some turbulators of the plurality of turbulators are offset from the partial-length rib.

4. The airfoil of claim 3 further comprising a corner defined at an intersection between the full-length rib and the tip and at least one turbulator of the plurality of turbulators is disposed in the corner and in direct contact with the full-length rib.

5. The airfoil of claim 3 further comprising a radiused corner at an intersection between the full-length rib and the tip and at least one turbulator of the plurality of turbulators disposed at least partially along the radiused corner.

6. The airfoil of claim 5 wherein the facing wall of the plurality of turbulators is orthogonal to the interior surface.

7. The airfoil of claim 1 wherein at least one turbulator of the plurality of turbulators is disposed directly on the partial-length rib.

8. The airfoil of claim 1 wherein at least one turbulator of the plurality of turbulators is disposed directly on at least one of the pressure sidewall and the suction sidewall.

9. The airfoil of claim 8 wherein the plurality of turbulators retards dust collection within the tip turn.

10. The airfoil of claim 9 wherein the angled wall of one or more turbulators of the plurality of turbulators is radiused.

11. The airfoil of claim 1 wherein at least one turbulator of the plurality of turbulators is disposed directly on a terminal end of the partial-length rib and extends towards the tip.

12. The airfoil of claim 1 wherein one or more of the plurality of turbulators includes the angled wall that is radiused.

13. The airfoil of claim 1 wherein the plurality of turbulators minimizes dust collection within the tip turn.

14. An airfoil for a turbine engine, the airfoil comprising an outer surface bounding an interior extending radially between a root and a tip to define a span-wise direction having a tip turn in the interior adjacent the tip radially exterior of a partial-length rib, with a plurality of turbulators having a flat facing wall extending perpendicular from an interior surface of the tip turn at which the turbulator mounts, and having an angled wall returning from the facing wall to the interior surface from the flat facing wall, with the plurality of turbulators disposed at least partially within the tip turn.

15. The airfoil of claim 14 wherein the plurality of turbulators are disposed entirely within the tip turn.

16. The airfoil of claim 14 further comprising a corner disposed within the turn and at least one turbulator of the plurality of turbulators is disposed in the corner and in direct contact with a full-length rib.

17. The airfoil of claim 14 further comprising a radiused corner within the tip turn and at least one turbulator of the plurality of turbulators is disposed at least partially along the radiused corner.

18. The airfoil of claim 17 wherein the angled wall is concave relative to the tip turn.

19. The airfoil of claim 14 wherein the plurality of turbulators minimizes dust collection within the tip turn.

20. The airfoil of claim 14 wherein one or more of the plurality of turbulators has the angled wall that is concave curved inwardly, curving away from the tip turn.

* * * * *